(12) United States Patent
Haase

(10) Patent No.: US 12,455,188 B2
(45) Date of Patent: Oct. 28, 2025

(54) CONTAINER OR PLATFORM SCALES

(71) Applicant: Siemens Aktiengesellschaft, Munich (DE)

(72) Inventor: Patrick Haase, Hamburg (DE)

(73) Assignee: Siemens Aktiengesellschaft, Munich (DE)

( * ) Notice: Subject to any disclaimer, the term of this patent is extended or adjusted under 35 U.S.C. 154(b) by 545 days.

(21) Appl. No.: 17/908,778

(22) PCT Filed: Mar. 3, 2021

(86) PCT No.: PCT/EP2021/055405
§ 371 (c)(1),
(2) Date: Feb. 6, 2023

(87) PCT Pub. No.: WO2021/175963
PCT Pub. Date: Sep. 10, 2021

(65) Prior Publication Data
US 2023/0184581 A1 Jun. 15, 2023

(30) Foreign Application Priority Data
Mar. 4, 2020 (DE) ............ 10 2020 202 797.8

(51) Int. Cl.
G01G 23/01 (2006.01)
G01G 21/22 (2006.01)
G01G 23/37 (2006.01)

(52) U.S. Cl.
CPC ............ G01G 23/01 (2013.01); G01G 21/22 (2013.01); G01G 23/3707 (2013.01)

(58) Field of Classification Search
CPC ..... G01G 21/22; G01G 23/01; G01G 23/3707
See application file for complete search history.

(56) References Cited

U.S. PATENT DOCUMENTS 5,167,289 A * 12/1992 Stevenson ............ G01G 5/04
177/209
5,487,603 A * 1/1996 Hoff .................. B01F 35/881
700/285
(Continued)

FOREIGN PATENT DOCUMENTS

CN 101084418 12/2007
CN 204705398 10/2015
(Continued)

OTHER PUBLICATIONS

PCT International Search Report and Written Opinion of International Searching Authority mailed Jun. 17, 2021 corresponding to PCT International Application No. PCT/EP2021/055405 filed Mar. 3, 2021.
(Continued)

Primary Examiner — Natalie Huls
(74) Attorney, Agent, or Firm — Cozen O'Connor

(57) ABSTRACT

A set of container or platform scales of which the weighing platform or weighing container is placed on three or four analogous weighing cells, wherein individual signals of the weighing cells are added up in a summing device to form a total signal from which an evaluation device determines a weight value and outputs said weight value, where the summing device is configured to add the individual signals without reaction, where the evaluation device contains an analog/digital converter for digitizing the individual signals
(Continued)

and a diagnosis device that evaluates the digitized individual signals to form diagnosis information and outputs the diagnosis information.

17 Claims, 4 Drawing Sheets

(56) References Cited

U.S. PATENT DOCUMENTS

| | | | | |
|---|---|---|---|---|
| 5,610,343 | A * | 3/1997 | Eger | G01G 3/1412 177/210 R |
| 5,805,467 | A * | 9/1998 | Richards | G01G 23/3707 177/164 |
| 6,002,090 | A | 12/1999 | Johnson et al. | |
| 6,246,967 | B1 * | 6/2001 | Libicki | G01G 19/02 702/175 |
| 10,371,566 | B1 * | 8/2019 | Smith | G01G 23/01 |
| 2002/0066602 | A1 * | 6/2002 | Bliss | G01G 23/3735 177/25.13 |
| 2006/0100808 | A1 | 5/2006 | Lueschow et al. | |
| 2011/0155474 | A1 * | 6/2011 | Rice | G01G 19/02 177/25.18 |
| 2012/0204978 | A1 * | 8/2012 | Ozamiz Fortis | B65D 90/48 137/552 |
| 2016/0018254 | A1 * | 1/2016 | Wechselberger | G01G 23/01 177/1 |
| 2016/0138995 | A1 * | 5/2016 | Trinko | G01G 23/36 73/65.09 |
| 2017/0205271 | A1 * | 7/2017 | Zhang | H04W 84/18 |
| 2018/0340856 | A1 | 11/2018 | Wang et al. | |
| 2021/0239514 | A1 * | 8/2021 | Zhang | G01G 23/18 |

FOREIGN PATENT DOCUMENTS

| | | |
|---|---|---|
| CN | 107961014 | 4/2018 |
| CN | 108955852 | 12/2018 |
| CN | 109556698 | 4/2019 |
| CN | 209342222 | 9/2019 |
| DE | 3409202 | 9/1985 |
| DE | 102015214945 | 2/2017 |
| EP | 2221591 | 8/2010 |
| KR | 20190066540 | 6/2019 |
| WO | 02087928 | 11/2002 |
| WO | 2004059264 | 7/2004 |

OTHER PUBLICATIONS

Industrial Solutions From Mettler Toledo; "See how Powerdeck Increases Production Yields"; youtube clip—ausgewählte Stellen; pp. 1-8; 2019.

Siemens: "Wägesysteme—Wageelektronik Siwarex WP321"; Betriebsanleitung; 2019.

Siemens: "Siwarex DB—your connection to the digital world";. youtube clip—ausgewählte Stellen; pp. 1-6; 2019.

Zhou Zulian et al. "Weighing, eccentric load, No. weight calibration, weighing method measure the center of gravity", Technology Exchange, p. 17-29, Jan. 15, 2019.

* cited by examiner

CONTAINER OR PLATFORM SCALES

CROSS-REFERENCE TO RELATED APPLICATIONS

This is a U.S. national stage of application No. PCT/EP2021/055405 filed 3 Mar. 2021. Priority is claimed on German Application No. 10 2020 202 797.8 filed 4 Mar. 2020, the content of which is incorporated herein by reference in its entirety.

BACKGROUND OF THE INVENTION

1. Field of the Invention

The invention relates to a set of container scales or platform scales, the weighing platform or weighing container of which is placed on three or four analog weighing cells, having a summing facility that sums the individual signals of the weighing cells to form a complete signal, and having an evaluation facility that determines a weight value from the complete signal and outputs the weight value.

2. Description of the Related Art

Industrial container scales and platform scales comprise an electronic weighing system (evaluation facility), in part with a display on site, and a weighing container (for example, a silo) or a weighing platform that, depending upon the type of construction, stands on three or four weighing cells. Primarily, analog weighing cells with expansion measuring strips (EMS) are used in a bridge circuit. The weighing cells are connected to a clamping box (junction box) via electrical lines and the EMS bridge circuits are connected in parallel in the junction box, with the result that the analog measurement signals (individual signals) of the weighing cells are added to form a complete signal. The complete signal is relayed via a signal cable to the evaluation facility that comprises inter alia a measurement amplifier and an analog/digital converter and evaluates the complete signal of the weighing cells to form a weight value and displays the weight value and/or transmits the weight value to a superordinate controller.

There is a requirement for a diagnostic and monitoring function in order to support the user during commissioning, maintenance or also during the operation of the scales and to provide the user with information regarding the prevailing status of the scales. As a result, both the time for commissioning and maintenance and also consequently associated stoppage times of the installation together with the resultant loss of production can be reduced.

SUMMARY OF THE INVENTION

It is a an object of the invention to provide container scales or platform scales set of container scales or platform scales having a weighing platform or weighing container that is placed on three or four analog weighing cells.

This and other objection are achieved in accordance with the invention by a set of container scales or platform scales, the weighing platform or weighing container of which is placed on three or four analog weighing cells, having a summing facility that sums the individual signals of the weighing cells to form a complete signal, and having an evaluation facility that determines a weight value from the complete signal and outputs said weight value, where the summing facility is configured to sum the individual signals without reaction and where the evaluation facility has an analog/digital converter for digitizing the individual signals of the weighing cells and a diagnostic facility, which evaluates the digitized individual signals to create diagnostic information and outputs the diagnostic information.

By virtue of the fact that the individual signals of the weighing cells are summed without reaction to form the complete signal that is decisive for the weight that is to be measured, they are available undistorted for a differentiated evaluation for diagnostic purposes. The summing facility can comprise an analog summing amplifier (inverting adder) having an operation amplifier, which adds the analog individual signals without reaction. The individual signals are digitized for the diagnostic evaluation that is performed in a digital manner. Accordingly, the summing facility can be alternatively configured so as to add the digitized individual signals.

The diagnostic facility can configured to receive information regarding the spacings of the weighing cells or placement points of the weighing platform or of the weighing container and from this information and the digitized individual signals of the weighing cells to determine the center of gravity of the scales and to output said center of gravity. The information regarding the spacings of the weighing cells or placement points of the weighing platform or of the weighing container can be input, for example, by an operator or fitter of the scales via a suitable user interface. It is possible via the same user interface to also output in a visual, in particular graphic, manner, the determined center of gravity of the scales, in particular its lateral coordinates parallel to the placement surface.

In the simplest case, it is also possible without an input to display the center of gravity distribution by outputting the values of the digitized individual signals or their graphic illustration, such as in the form of a bar chart.

The automatic determination of the center of gravity facilitates the construction and orientation of the scales, where it is also possible to detect force shunts or transverse forces. It is preferred that the diagnostic facility is configured to store, in a storage device, the position of the determined center of gravity of the non-loaded scales and to determine the position of the center of gravity of the loaded scales and/or of a load on the scales as a deviation from the stored center of gravity of the non-loaded scales and to output the position. It is possible in this manner to obtain, for example, information regarding the material distribution in the weighing container or center of gravity shifts in the case of subsequent changes, modifications or extensions to the container.

Force shunts on the weighing cells and/or the risk of the weighing container or load lifting off in presence of wind or on account of other external influences can be detected in an advantageous manner, because the values of the digitized individual signals that are obtained in the case of a non-loaded scales are stored in the storage device as zero point values of the relevant weighing cells and the digitized individual signals that are obtained during the running operation of the scales are compared with one another after the deduction of the associated zero point values. Thus, in the case of force shunts, the relationships of the individual weight values at the weighing cells change with respect to one another, with the result that, in the case of large deviations, a warning with reference to a possible force shunt and consequently an erroneous measurement can be output. The risk of the container or the scales lifting off can be detected by monitoring the individual weight values at the weighing cells in comparison to the zero point values, if the loading of a weighing cell or adjacent weighing cells in comparison to the zero point (dead load) becomes zero or its effective direction changes from a pressure loading into a tensile loading.

Different degrees of sensitivity of the weight cells can result in off-center load errors, in other words can result in different weight values for the same load depending upon their position on the scales, for example, on the weighing platform. In order to render it possible to compensate in a digital manner for an off-center load, the diagnostic facility can determine the off-center load error of the scales from the values of the digitized individual signals, said values being obtained in the case of the scales being loaded at different sites with one and the same calibration weight, and from this the diagnostic facility can calculate correction factors for the individual signals that are to be summed to form the complete signal.

In the event of a malfunction of an individual weighing cell, the entire industrial scales generally come to a standstill. In order to prevent this, the evaluation facility is preferably configured to detect the malfunction of individual weighing cells by monitoring the impedances of the connected weighing cells; then, with reference to the digitized individual signals of the intact weighing cells, the diagnostic facility calculates substitute values for the individual signals of the respectively malfunctioning weighing cells and makes these available for the determination of the weight value of the load that is to be measured.

Finally, the diagnostic facility can be configured to evaluate the frequency content of the individual signals and from this to extract information regarding dynamic weighing processes or the handling of the product to be weighed on the scales and to output said information. As a result, it is possible without an additional sensor system to monitor, for example, a metering procedure or the mixing of the medium in the weighing container via a stirrer or to perform an automatic calculation of filter parameters of a filter, with which the individual signals that are summed so as to determine the weight value are filtered.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Furthermore, the invention is explained with the aid of exemplary embodiments and with reference to the figures of the drawing, in which.

DETAILED DESCRIPTION OF THE EXEMPLARY EMBODIMENTS

Figure 1:
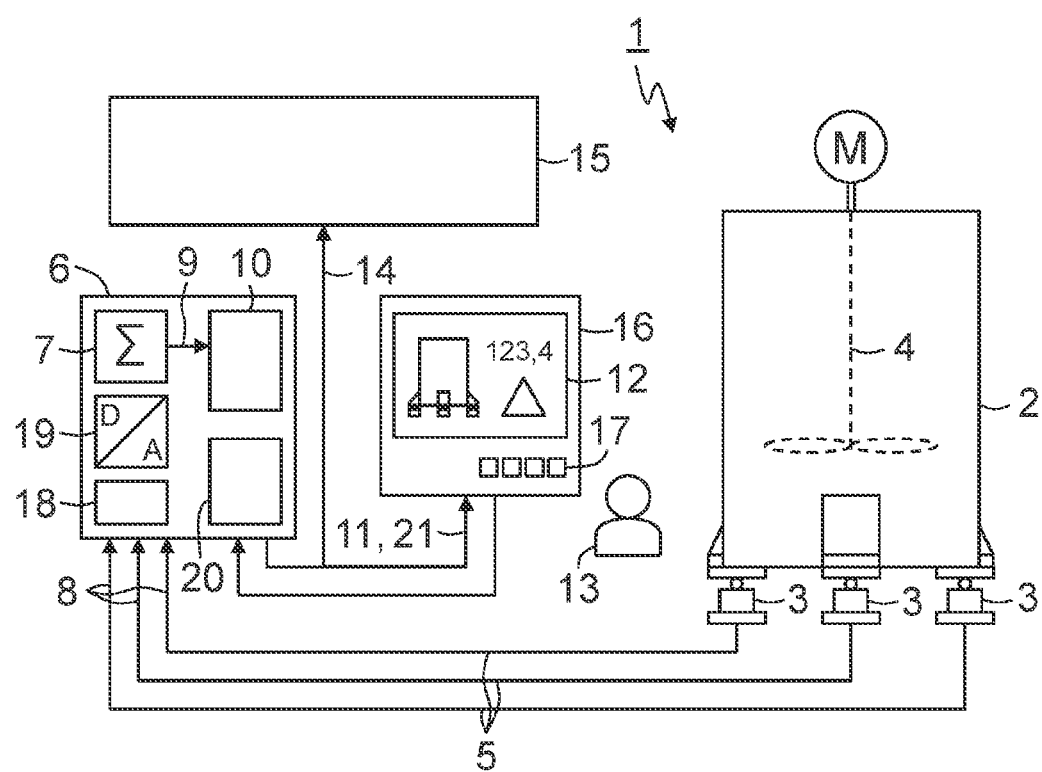
FIG. 1 shows an exemplary embodiment of a set of container scales in accordance with the invention.

Identical reference characters have the same meaning in the different figures. The illustrations are purely schematic and do not represent any size ratios.

FIG. 1 illustrates a set of container scales 1 having a weighing container 2 that is placed on three analog weighing cells 3. The illustrated weighing container 2 is a stirrer tank having a stirrer 4. However, the container 2 can also be a silo, a tank, a filling funnel or the like. It is also possible to use four weighing cells, for example, if the container 2 or a weighing platform, not illustrated here, in lieu of the container have a square or rectangular base area. The load that rests on the weighing cells 3 as a result of the entire mechanical construction without the useful load that is to be measured, in this case, for example, the medium in the container 2, is described as the dead load. The weighing cells 3 are connected via lines 5 to an evaluation facility (electronic weighing system) 6, in which a summing facility 7 sums the individual signals 8 of the weighing cells 3 to form a complete or summed signal 9. A calculation unit 10 of the evaluation facility 6 determines, from the complete signal 9, a weight value 11 that is displayed on a display 12 of the scales 1 for a user 13 and/or is otherwise transmitted via a connection 14 to a superordinate facility or controller 15 for the purpose of control, documentation, display, and/or deduction. The display 12 is a component of a user interface 16 that moreover has means 17 for inputting information regarding the scales 1, such as the positions of the weighing cells 3.

Moreover, the evaluation facility 6 comprises a monitoring facility 18 that measures and monitors the impedances of the connected weighing cells 3 to detect a malfunction of individual weighing cells 3 or a line fracture or short circuit of the lines 5.

Finally, the evaluation unit 6 comprises an analog/digital convertor 19 that digitizes the individual signals 8 of the weighing cells and supplies them to a diagnostic facility 20 that determines diagnostic information 21 from the digitized individual signals 8 and displays the information on the display 12 for the user 13 and/or, where appropriate, transmits it to the superordinate facility 15.

Figure 2:
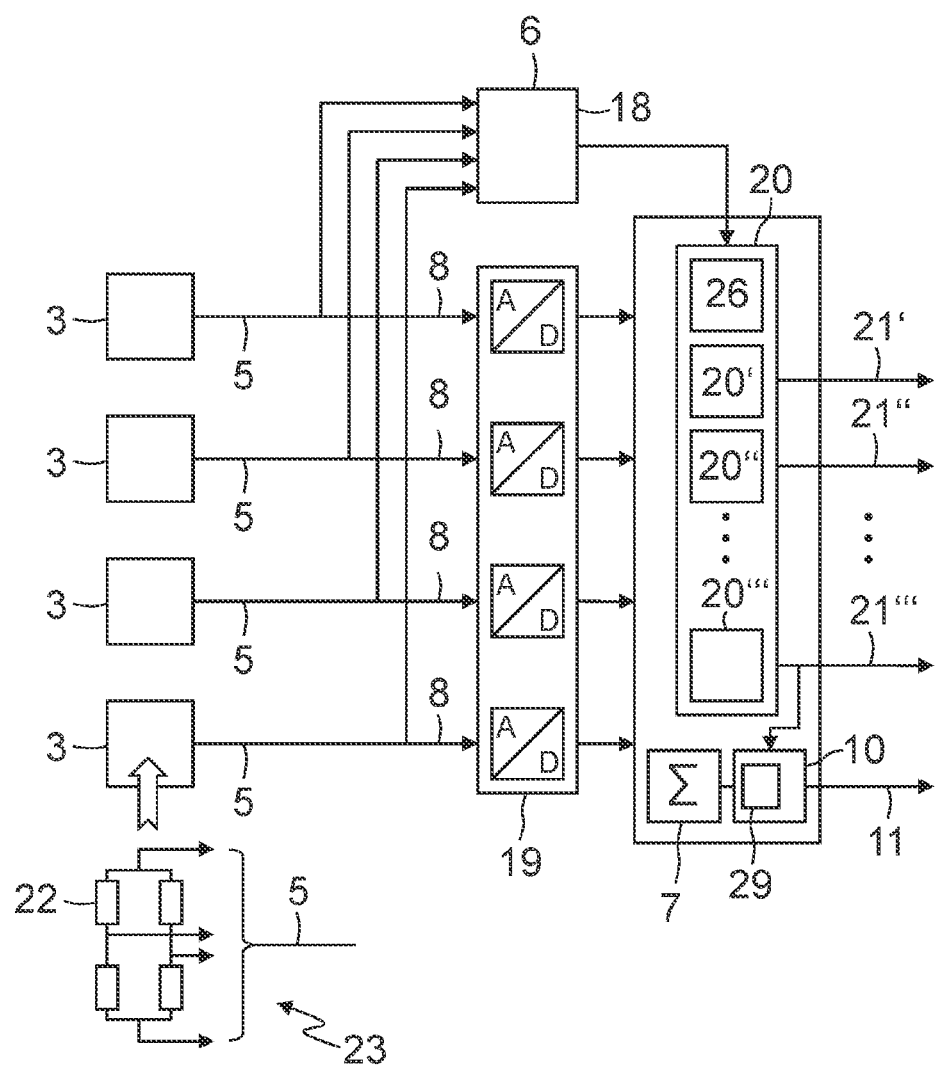
FIG. 2 shows an exemplary evaluation facility in accordance with the invention.

FIG. 2 illustrates an exemplary embodiment of the evaluation facility 6, in which the individual signals 8 of the, in this case, for example, four, weighing cells 3 are digitized in the analog/digital converter 19 and subsequently supplied both to the diagnostic facility 20 and also to the, in this case digital, summing facility 7. The calculation unit 10 determines the weight value 11 from the digital complete signal that is supplied by the summing facility 7. The diagnostic facility 20 comprises multiple diagnostic modules 20', 20", 20"' that process the digitized individual signals 8 to create different diagnostic information 21', 21", 21"'. Here, the diagnostic facility 20 can be controlled by the monitoring facility 18, which measures the impedances of the connected weighing cells 3 in order, in the event that a malfunction of individual weighing cells 3 is detected, to calculate substitute values, such as 21''', for the individual signals 8 of the respectively malfunctioning weighing cells 3 and to provide the substitute values for the determination of the weight value 11.

Moreover, as illustrated in FIG. 2, each of the analog weighing cells 3 comprises respectively expansion measuring strips (EMS) 22 in a bridge circuit 23.

Figure 3:
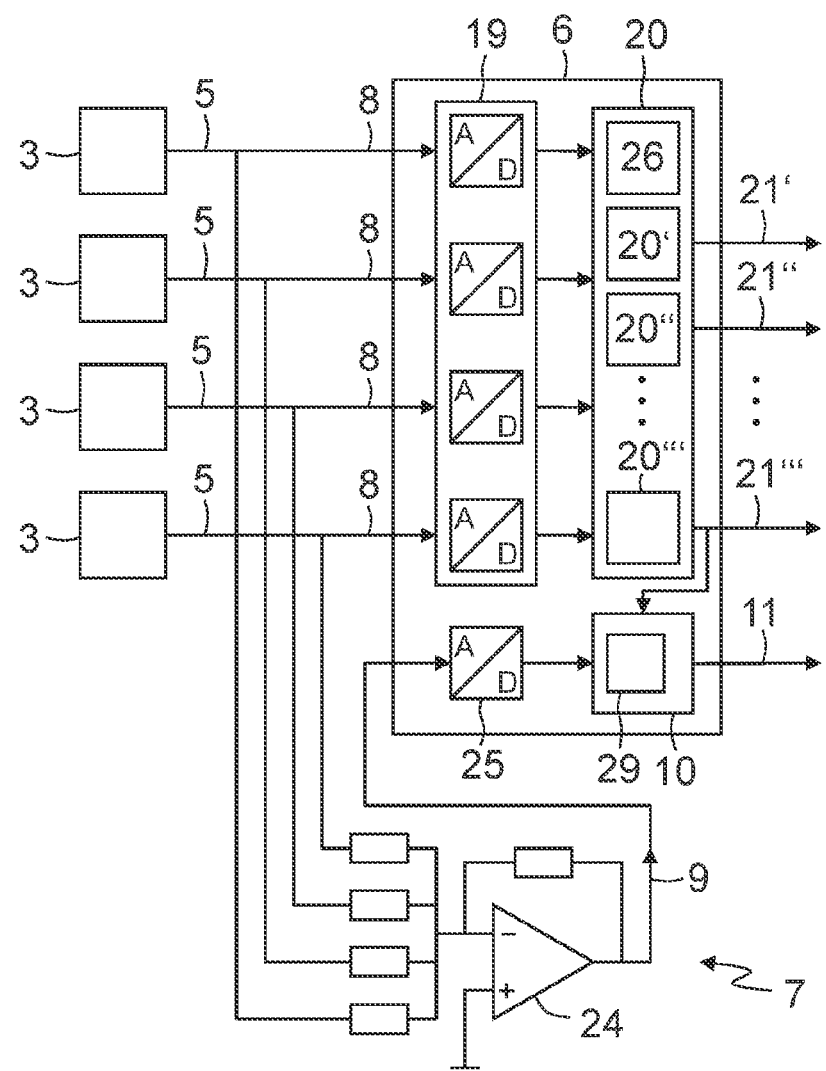
FIG. 3 shows a further exemplary evaluation facility in accordance with an embodiment of the invention.

FIG. 3 illustrates a further exemplary embodiment of the evaluation facility 6, in which, in contrast to the example of FIG. 2, the individual signals 8 of the weighing cells 3 are added in an analog summing amplifier (inverting adder) 24 and subsequently digitized in an analog/digital converter 25 and supplied to the calculation facility 10. Moreover, the exemplary embodiment does not differ in principle from the exemplary embodiment of FIG. 2, where also in this case it is possible to provide a monitoring facility that measures the impedances of the connected weighing cells 3 and that is not illustrated merely for the sake of overview or simplicity.

The mechanics of the scales 1 are decisive for the measurement result because, in this case in practice, the most frequent errors can occur both in the construction and also during the operation of the scales. Thus, it is to be ensured during the construction of the scales that approximately the same load acts on all weighing cells 3 or placement points of the weighing container 2 or of the weighing platform. If, for example, the center of gravity of the scales is not central or the weighing cells are not all oriented at the same height and level, with the result that, for example, one set of scales stands only on two of four weighing cells, it is then possible for individual weighing cells to become overloaded while other weighing cells in certain circumstances can be subjected to negative loadings, in other words to tensile forces. Furthermore, it is to be ensured that force shunts are not present or do not occur, i.e., the weighing container or the weighing platform is mechanically uncoupled from the base upon which the scales are standing. Such force shunts can occur by way of example as a result of imprecisely adjusted components, such as mechanical protection facilities against overloading, transverse forces or lifting off (toppling) of the scales, as a result of the scales becoming contaminated or as a result of pipe lines that are not uncoupled from and to the weighing container.

Furthermore, external influences act on the weight measurement. The external influences include inter alia temperature influences, such as natural temperature fluctuations, cooling or heating of the container 2, the temperature of the medium in the container 2 or exothermic or endothermic chemical reactions that can cause heat expansion or contraction of the container construction, wind forces that act on the container 2, vibrations in the installation in which the scales are installed, and/or dirt deposits on the weighing cells 3, which can cause problems such as transverse forces, axial forces, torques or force shunts in the region of the weighing cells 3.

As further explained subsequently, the diagnostic modules 20', 20'', 20''' of the diagnostic facility 20 can perform different monitoring and diagnostic tasks to support the user during commissioning, maintenance or also during the operation of the scales 1 and to provide the user with information regarding the prevailing status of the scales 1.

It is assumed that the scales 1 have four weighing cells 3. By digitizing the individual signals 8 of the weighing cells 3, the following digital values of the respective nth weighing cell (accordingly weighing cell Wn, n=1, 2, 3, 4) are obtained depending upon the loading of the scales 1:

DWn Measurement value of the weighing cell Wn,
J0Wn Zero point value of the weighing cell Wn with non-loaded scales,
J1Nn Adjustment value of the weighing cell Wn with loaded scales using a calibration weight.

Initially, the zero point of the non-loaded scales 1 is assumed, where the zero point values J0Wn that are obtained are stored in a storage device 26 (FIGS. 2 and 3) of the diagnostic facility 20. In order to determine the center of gravity of the scales 1, it is possible for the user 13, via the input means 17, to input into the evaluation facility information regarding the relative positions of the weighing cells W1, W2, W3 and W4, where this information can be illustrated graphically on the display 12 of the user interface 16.

Figure 4:
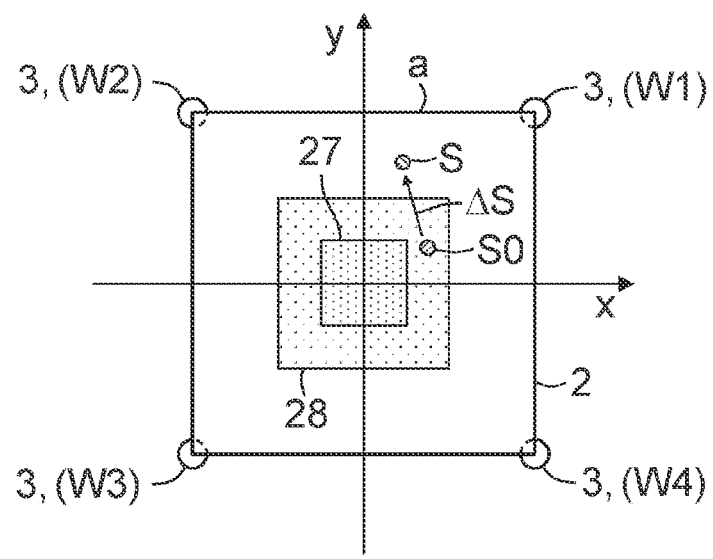
FIGS. 4 and 5 show exemplary visualizations of diagnostic information in accordance with the invention.

FIG. 4 illustrates this by way of example for a container 2 having a square base area and a side length a. The diagnostic facility 20, by way of example the diagnostic module 20', calculates from this information the positions or lateral coordinates (xn, yn) of the individual weighing cells Wn:

$$(x1, y1) = \left(+\frac{a}{2}, +\frac{a}{2}\right),$$
$$(x2, y2) = \left(+\frac{a}{2}, -\frac{a}{2}\right),$$
$$(x3, y3) = \left(-\frac{a}{2}, -\frac{a}{2}\right),$$
$$(x4, y4) = \left(-\frac{a}{2}, +\frac{a}{2}\right)$$

and furthermore calculates the coordinates $(x_{s0}, y_{s0})$ of the center of gravity S0 of the non-loaded scales 1:

$$x_{S0} = \frac{x1 \cdot J0W1 + x2 \cdot J0W2 + x3 \cdot J0W3 + x4 \cdot J0W4}{J0W1 + J0W2 + J0W3 + J0W4} \text{ and}$$

$$y_{S0} = \frac{y1 \cdot J0W1 + y2 \cdot J0W2 + y3 \cdot J0W3 + y4 \cdot J0W4}{J0W1 + J0W2 + J0W3 + J0W4}.$$

The position of center of gravity S0 of the non-loaded scales 1 can be visualized on the display 12, as illustrated by way of example in FIG. 4. In the ideal case, in other words in the case of an optimal facility of the scales 1, the center of gravity S0 lies in the intersection of the x and y axes, which correspond to the symmetrical axes of the scales 1 or of the container 2. Different tolerance regions 27, 28 can indicate whether the determined center of gravity position can be tolerated for the operation of the scales 1. The determination of the center of gravity S0 and its visualization facilitate the construction and orientation of the scales 1, where it is also possible to detect force shunts or transverse forces. Here, it should be understood the manner in which the visualization is performed can differ greatly. Thus, it is also possible, for example, to represent the zero point values J0W1, J0W2, J0W3 and J0W4 in the form of a bar chart, where the deviations of the individual bars from the average value of the zero point values indicate the required adjustment at the associated weighing cells W1, W2, W3 and W4.

Figure 5:
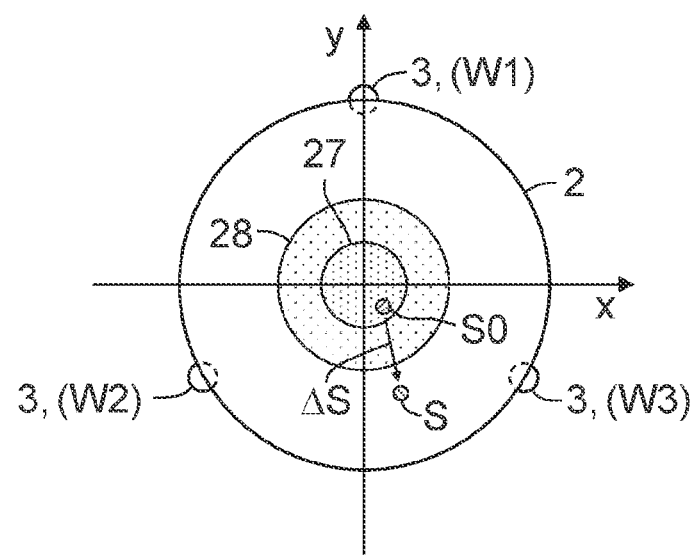

FIG. 5 illustrates an example of the visualization of the center of gravity in the case of scales having three weighing cells, W1, W2 and W3.

The determined coordinates $(x_{s0}, y_{s0})$ of the center of gravity S0 of the non-loaded scales 1 are stored in the storage device 26. This renders it possible, during the running operation of the scales 1, to monitor the center of gravity S of the medium in the weighing container 2 or the useful load on the weighing platform. This occurs by virtue of the fact that the diagnostic facility 20 or one of its modules 20', 20'', 20''' determines the position $(x_s, y_s)$ of the center of gravity S of the loaded scales 1 as follows:

$$xs = \frac{x1 \cdot DW1 + x2 \cdot DW2 + x3 \cdot DW3 + x4 \cdot DW4}{DW1 + DW2 + DW3 + DW4},$$

$$ys = \frac{y1 \cdot DW1 + y2 \cdot DW2 + y3 \cdot DW3 + y4 \cdot DW4}{DW1 + DW2 + DW3 + DW4},$$

and visualizes the position $(x_s, y_s)$ of the center of gravity S of the loaded scales 1 together with the position $(x_{s0}, y_{s0})$ of the center of gravity S0 of the non-loaded scales 1 or the deviation ΔS between the two centers of gravity S, S0 on the display 12. In the case of bulk products, it is possible, by monitoring the center of gravity, for example, to detect prematurely the formation of bridges or products backing up against the inner wall of the weighing container 2. However, monitoring also renders it possible, for example, to detect any loadings on the scales as a result of wind forces.

Without the input and knowledge of the relative positions of the weighing cells W1, W2, W3 and W4, it is possible to indicate at least the center of gravity distribution, in that for example, the measurement values, zero point values or adjustment values DWn, J0Wn, J1Wn of the weighing cells W1, W2, W3 and W4 are output directly or in the form of a graphic illustration, such as in a bar chart.

Force shunts can be detected within the scope of the diagnosis by comparing the digital measurement values DWn of the individual weighing cells Wn, where the digital measurement values are preferably adjusted by the zero point values J0Wn, and where diagnostic information 21 is output as a warning in the case of large differences between the measurement values DWn.

The risk of the container scales 1 lifting off on account of wind forces is detected by monitoring the digital measurement values DWn of the individual weighing cells Wn in comparison to the zero point values J0Wn. One indicator of this is, if, for example, in the case of one weighing cell or two adjacent weighing cells, the digital measurement value DWn that is adjusted by its zero point value J0Wn becomes zero or is negative.

As already mentioned above, the diagnostic facility 20 can be controlled by the monitoring facility 18 that measures the impedances of the connected weighing cells 3, in order in the event that a malfunction of individual weighing cells 3 is detected, to calculate substitute values 21''' for the individual signals 8, to be precise the corresponding digital measurement values DWn, of the respectively malfunctioning weighing cells 3 and to provide the substitute values for the determination of the weight value 11.

In order to compensate for a malfunctioning weighing cell, for example W2, it is possible to use an average value of the digital measurement values DW1, DW3, DW4 of the remaining weighing cells W1, W3, W4 and to use this average value as a substitute value for the defective weighing cells W2:

$$DW2 = \frac{DW1 + DW3 + DW4}{3}.$$

In order to mask out the influence of possible asymmetries and tensions during the installation of the scales 1, the calculation of the substitute value DW2 can be adjusted by the zero point values J0Wn from the storage device 26:

$$DW2 = + \frac{(DW1 - J0W1) + (DW3 - J0W3) + (DW4 - J0W4)}{3} + J0W2.$$

An adjustment can also be made with the aid of the adjustment values J1Wn that are determined in the case of a loading on the scales 1 using a calibration weight and are likewise stored in the storage device 26:

$$DW2 = \frac{J1W2}{3} \cdot \left( \frac{DW1}{J1W1} + \frac{DW3}{J1W3} + \frac{DW4}{J1W4} \right).$$

It is also possible here to perform another adjustment by the zero point values J0Wn:

$$DW2 = \frac{J1W2 - J0W2}{3} \cdot$$
$$\left( \frac{DW1 - J0W1}{J1W1 - J0W1} + \frac{DW3 - J0W3}{J1W3 - J0W3} + \frac{DW4 - J0W4}{J1W4 - J0W4} \right) + J0W2.$$

Similarly, in the case of a simultaneous malfunction of two weighing cells, for example W1 and W2, it is possible to calculate their substitute values D1 and D2 from the remaining weighing cells W3, W4, as follows:

$$DW1 = \frac{J1W1 - J0W1}{2} \cdot \left( \frac{DW3 - J0W3}{J1W3 - J0W3} + \frac{DW4 - J0W4}{J1W4 - J0W4} \right) + J0W1$$

$$DW2 = \frac{J1W2 - J0W2}{2} \cdot \left( \frac{DW3 - J0W3}{J1W3 - J0W3} + \frac{DW4 - J0W4}{J1W4 - J0W4} \right) + J0W2.$$

Using a set of scales having three weighing cells W1, W2 and W3 (FIG. 5) as an example, an explanation is provided below about how an automatic digital off-center load-adjustment of the scales 1 can be performed. As already mentioned, different degrees of sensitivity of the individual weighing cells 3 can result in off-center load errors. Changes of the determined weight value 11 when the same load is placed on different sites of the scales are described as off-center load errors.

In a first step, a calibration weight, for example, 100 kg, is placed in succession on the three key points of the scales 1, in other words on the sites of the weighing cells 3, where the adjustment values J1W1, J1W2, J1W3 are obtained. These adjustment values can be different on account of different degrees of sensitivity of the weighing cells 3. The adjustment values are now adjusted by the zero point values J0Wn from the storage device 26:

ΔW1=J1W1–J0W1

ΔW2=J1W2–J0W2

ΔW3=J1W3–J0W3

The smallest value, in this case for example ΔW3, is selected from the adjusted value ΔWn.

In a next step, as illustrated below, correction factors Fn are calculated for the individual signals 8 that are to be summed to form the complete signal 11 and stored in the storage device 26:

$$F1 = \frac{\Delta W3}{\Delta W1} = \frac{J1W3 - J0W3}{J1W1 - J0W1}$$

$$F2 = \frac{\Delta W3}{\Delta W2} = \frac{J1W3 - J0W3}{J1W2 - J0W2}$$

-continued $$F3 = \frac{\Delta W3}{\Delta W3} = 1$$

In the case of the weight measurement, the individual signals 8 that are to be summed, in this case, for example, the digital measurement values DWn that have been adjusted by the zero point values J0Wn, are multiplied by the calculated factors Fn in order thus to obtain off-center load-adjusted measurement values DWEn:

$$DWE1=F1(DW1-J0W1)$$

$$DWE2=F2(DW2-J0W2)$$

$$DWE3=F3(DW3-J0W3)=(DW3-J0W3)$$

The off-center load-adjusted measurement values DWEn are subsequently added in the digital summing facility 7 (FIG. 2) to form a complete signal DWE1+DWE2+DWE3 that represents the weight value 11.

Subsequently, it is possible in one of the diagnostic modules 20', 20", 20''' to evaluate frequency content of the digitized individual signals 8 and to extract therefrom information regarding dynamic weight processes or the handling of the product being weighed on the scales 1 and to output the information. Thus, for example, the stirrer 4 (FIG. 1) generates in the container 2 vibrations and oscillations that are experienced by the weighing cells 3 and manifested in the individual signals 8. By filtering or frequency analysis (for example, Fourier transformation) of the digitized individual signals, it is possible, for example, to extract the rotational frequency of the stirrer 4 and, where appropriate, with the aid of phase shifts of the individual signals to detect the rotational frequency. The frequency spectrum also renders it possible to conclude the technical state of the stirrer 4. With the aid of the amplitude of the signal portions that correlate with the rotational speed, it is possible, for example, to check the state of the medium in the weighing container 2 or in the case of a mixing or reaction process to estimate when this process will be terminated.

It can be necessary during the determination of the weight value 11 to filter the summed individual signals 8 of the weighing cells 3 in a filter 29 of the evaluation facility 6 to eliminate interference, such as if the scales 1 are used for metering purposes and the product is to be metered while the stirrer 4 is running. Whereas it has hitherto been necessary to adjust and adapt the filter parameters manually, it is now possible by determining the frequencies of the digitized individual signals to automate the procedure of adapting the filter. Also, these frequencies can be compared with the adjusted rotational speed of the stirrer 4 and deviations that occur are reported to the installation driver.

Thus, while there have been shown, described and pointed out fundamental novel features of the invention as applied to a preferred embodiment thereof, it will be understood that various omissions and substitutions and changes in the form and details the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A set of container scales or platform scales having a weighing platform or weighing container which is placed on three or four analog weighing cells, the set of container scales or platform scales comprising:
a summing facility which sums individual signals of the three or four weighing cells to form a complete signal; and
an evaluation facility which determines a weight value from the complete signal and outputs said weight value;
wherein the summing facility is further configured to sum the individual signals without reaction;
wherein the evaluation facility comprises an analog/digital converter for digitizing the individual signals of the weighing cells and a diagnostic facility which evaluates the digitized individual signals to create diagnostic information and outputs the diagnostic information;
wherein the diagnostic facility is configured to receive information regarding one of (i) positions or spacings (a) of the weighing cells and (ii) placement points of the weighing platform or the weighing container and from this information and the digitized individual signals of the weighing cells to determine a position of a center of gravity of the scales and to output said position; and
wherein the diagnostic facility is further configured to store the position of the determined center of gravity of the non-loaded scales in a storage device and to determine at least one of (i) the position of the center of gravity of the loaded scales and (ii) a load on the scales as a deviation from the stored center of gravity of the non-loaded scales and to output said position.

2. The container scales or platform scales as claimed in claim 1, wherein the summing facility comprises an analog summing amplifier.

3. The container scales or platform scales as claimed in claim 1, wherein the summing facility is further configured to add the digitized individual signals.

4. The container scales or platform scales as claimed in claim 1, wherein the diagnostic facility is further configured to store in the storage device the values of the digitized individual signals, said values being obtained in the cases of non-loaded scales, as zero point values of the relevant weighing cells and to compare with one another the digitized individual signals, which are obtained during running operation of the scales, after deduction of an associated zero point values in order to detect at least one of (i) force shunts at the weighing cells and (ii) the load lifting off.

5. The container scales or platform scales as claimed in claim 1, wherein the diagnostic facility is further configured to determine an off-center load error of the scales from the values of the digitized individual signals, said values being obtained in cases of the set of scales that is loaded at different sites with one and the same calibration weight, and from the off-center load error to calculate correction factors for the individual signals which are to be summed to form the complete signal.

6. A set of container scales or platform scales having a weighing platform or weighing container which is placed on three or four analog weighing cells, the set of container scales or platform scales comprising:
a summing facility which sums individual signals of the three or four weighing cells to form a complete signal; and an evaluation facility which determines a weight value from the complete signal and outputs said weight value;

wherein the summing facility is further configured to sum the individual signals without reaction;

wherein the evaluation facility comprises an analog/digital converter for digitizing the individual signals of the weighing cells and a diagnostic facility which evaluates the digitized individual signals to create diagnostic information and outputs the diagnostic information;

wherein the evaluation facility is configured to detect the malfunction of individual weighing cells by monitoring the impedances of the connected weighing cells; and wherein the diagnostic facility is further configured to calculate substitute values for the individual signals of the respectively malfunctioning weighing cells and to provide said substitute values for the determination of the weight value aided by the digitized individual signals of intact weighing cells.

7. The container scales or platform scales as claimed in claim 6, wherein the summing facility is further configured to add the digitized individual signals.

8. The container scales or platform scales as claimed in claim 6, wherein the diagnostic facility is further configured to store in the storage device the values of the digitized individual signals, said values being obtained in the cases of non-loaded scales, as zero point values of the relevant weighing cells and to compare with one another the digitized individual signals, which are obtained during running operation of the scales, after deduction of an associated zero point values in order to detect at least one of (i) force shunts at the weighing cells and (ii) the load lifting off.

9. The container scales or platform scales as claimed in claim 6, wherein the diagnostic facility is further configured to determine an off-center load error of the scales from the values of the digitized individual signals, said values being obtained in cases of the set of scales that is loaded at different sites with one and the same calibration weight, and from the off-center load error to calculate correction factors for the individual signals which are to be summed to form the complete signal.

10. A set of container scales or platform scales having a weighing platform or weighing container which is placed on three or four analog weighing cells, the set of container scales or platform scales comprising:

a summing facility which sums individual signals of the three or four weighing cells to form a complete signal; and an evaluation facility which determines a weight value from the complete signal and outputs said weight value;

wherein the summing facility is further configured to sum the individual signals without reaction;

wherein the evaluation facility comprises an analog/digital converter for digitizing the individual signals of the weighing cells and a diagnostic facility which evaluates the digitized individual signals to create diagnostic information and outputs the diagnostic information; and wherein the diagnostic facility is further configured to evaluate a frequency content of the individual signals and from, said evaluated frequency content, extract information regarding dynamic weighing processes or the handling of the product which is to be weighed on the scales and to output said information.

11. The container scales or platform scales as claimed in claim 10, wherein the summing facility is further configured to add the digitized individual signals.

12. The container scales or platform scales as claimed in claim 10, wherein the diagnostic facility is further configured to store in the storage device the values of the digitized individual signals, said values being obtained in the cases of non-loaded scales, as zero point values of the relevant weighing cells and to compare with one another the digitized individual signals, which are obtained during running operation of the scales, after deduction of an associated zero point values in order to detect at least one of (i) force shunts at the weighing cells and (ii) the load lifting off.

13. The container scales or platform scales as claimed in claim 10, wherein the diagnostic facility is further configured to determine an off-center load error of the scales from the values of the digitized individual signals, said values being obtained in cases of the set of scales that is loaded at different sites with one and the same calibration weight, and from the off-center load error to calculate correction factors for the individual signals which are to be summed to form the complete signal.

14. A set of container scales or platform scales having a weighing platform or weighing container which is placed on three or four analog weighing cells, the set of container scales or platform scales comprising:

a summing facility which sums individual signals of the three or four weighing cells to form a complete signal; and an evaluation facility which determines a weight value from the complete signal and outputs said weight value;

wherein the summing facility is further configured to sum the individual signals without reaction;

wherein the evaluation facility comprises an analog/digital converter for digitizing the individual signals of the weighing cells and a diagnostic facility which evaluates the digitized individual signals to create diagnostic information and outputs the diagnostic information; and wherein the evaluation facility further comprises a filter which filters the individual signals which are summed to determine the weight value and the filter characteristic of said filter is automatically adjusted in response to an evaluation of a frequency content of the individual signals.

15. The container scales or platform scales as claimed in claim 14, wherein the summing facility is further configured to add the digitized individual signals.

16. The container scales or platform scales as claimed in claim 14, wherein the diagnostic facility is further configured to store in the storage device the values of the digitized individual signals, said values being obtained in the cases of non-loaded scales, as zero point values of the relevant weighing cells and to compare with one another the digitized individual signals, which are obtained during running operation of the scales, after deduction of an associated zero point values in order to detect at least one of (i) force shunts at the weighing cells and (ii) the load lifting off.

17. The container scales or platform scales as claimed in claim 14, wherein the diagnostic facility is further configured to determine an off-center load error of the scales from the values of the digitized individual signals, said values being obtained in cases of the set of scales that is loaded at different sites with one and the same calibration weight, and from the off-center load error to calculate correction factors for the individual signals which are to be summed to form the complete signal.

* * * * *